Patented Sept. 18, 1951

2,568,666

UNITED STATES PATENT OFFICE 2,568,666

ICE CREAM AND METHOD OF MAKING THE SAME

Hiram T. Spannuth, Chicago, Ill., assignor to Wilson & Co., Inc., a corporation of Delaware No Drawing. Application July 15, 1947, Serial No. 761,162

5 Claims. (Cl. 99—136).

This invention relates to improved ice cream and to a method for its manufacture. More particularly, it relates to means for decreasing the whipping period of ice cream mixes, and for imparting a dry appearance and improved texture to ice cream.

Commercial ice cream is made by mixing liquid milk ingredients, containing butterfat and milk solids not fat, with other ingredients which consist primarily of sugar. Not infrequently, there is incorporated into this mix a stabilizer such as gelatin, egg yolks and various gums. The mixture of liquid and dry ingredients is pasteurized, homogenized, aged, frozen, and the frozen mix whipped until the consistency and air content are satisfactory. The increase in volume due to whipping is known as overrun, and the rapid attainment of an overrun of 100% and proper mix consistency, concurrently without adversely affecting the quality of the finished ice cream, is an important factor in commercial ice cream production.

Ice cream with a dry-appearing surface is desirable from the standpoint of consumer appeal since the public generally prefers this type of product as against one that appears wet. An ice cream with good "melt down" characteristics, which softens slowly, without sloughing and without becoming too foamy, is also highly regarded by the consumer.

I have discovered that I can decrease the whipping time presently required to produce ice cream having the proper drawing consistency with an optimum overrun, and, additionally, produce ice cream having an unusually dry texture, excellent "melt down" qualities and increased stability against the loss of incorporated air because of mechanical action, by adding to the ice cream mix a small amount of a higher fatty alcohol, a higher fatty acid, or a mixture thereof. By "higher fatty alcohols" and "higher fatty acids" as used herein, I mean those fatty alcohols and fatty acids having at least twelve carbon atoms in the molecule.

Examples of such compounds are oleyl alcohol, cetyl alcohol, stearyl alcohol, lauryl alcohol, jojoba nut alcohols, oleic acid, palmitic acid, stearic acid, lauric acid, oleo stock fatty acids, lard stearin fatty acids, and the like.

According to a preferred embodiment of my invention, a higher fatty alcohol, higher fatty acid, or a mixture of these, preferably deodorized to remove foreign odors and flavors, is added to an ice cream mix before homogenization of the mix, in the amount of about 0.30% based on the weight of the ice cream mix. Somewhat lesser or greater amounts may be used with good results, as for example from about 0.01% to 1.0%, based on the weight of the ice cream mix. The addition can be made at any stage of the manufacture; however, I prefer to make the addition prior to the homogenization step in order to obtain more satisfactory dispersion through the mix.

To illustrate the effectiveness of these compounds in accordance with my invention, four batches of ice cream were made up and processed in an identical manner. These were labeled A, B, C and D. Batch A, which was used as a control, had the following composition:

| | Pounds |
|---|---|
| Cream (40% butterfat) | 18 |
| Condensed skim milk (30% solids) | 14.2 |
| Skim milk | 19.3 |
| Sugar | 8.2 |
| Gelatin, 225 bloom | 0.24 |

Batches B, C and D were identical in composition to Batch A except for the presence in these batches of various amounts and kinds of compounds hereinbefore mentioned, as follows:

| Batch Number | Compound | Amount added (based on weight of ice cream mix) |
|---|---|---|
| | | Per cent |
| B | Stearic Acid (Double pressed grade) | 0.30 |
| C | Stearyl Alcohol | 0.30 |
| D | Cetyl Alcohol | 0.30 |

In processing Batch A, the gelatin was mixed with the sugar. Then the cream, condensed milk and skim milk were placed in a pasteurizer, heated to 100° F. and the sugar-gelatin mixture added thereto. The temperature of this mixture was then raised to 160° F. and held at this point for 30 minutes. The mixture was then put through a two-stage homogenizer with a pressure of 2500 pounds on the first stage and 500 pounds on the second stage. Then the mixture was cooled to 40° F. by running it over a surface cooler, and maintained at this temperature for 24 hours.

Five gallons of this mix were placed in a ten-gallon direct expansion batch freezer and 20 cc. of vanilla extract added. The freezer was turned on and turned off when the temperature of the mix reached 24.5° F. The dasher was kept in operation until the mix reached an overrun of about 100%, at which point the ice cream was drawn off into containers, placed in a hardening room at minus 10° F., and held there for 24 hours.

Batches B, C and D were prepared in an identical manner except that the compounds as listed above were added, the addition being made to the milk products concurrently with the sugar and gelatin, in accordance with the procedure described in connection with Batch A.

During the whipping phase of the operation, the amount of time elapsed before each batch reached an overrun of approximately 100% was recorded with the following results:

| Batch Number | Overrun | Whipping Time |
|---|---|---|
| | Per cent | Minutes |
| A | 99 | 7½ |
| B | 104 | 7 |
| C | 99 | 6 |
| D | 101 | 5 |

After having been held in a hardening room for 24 hours, samples of ice cream from all of the batches were examined and scored for "body," "melt down" and "dryness." Batches B, C, and D had substantially improved "body," better "melt down" and were much dryer in appearance than the control Batch A.

From these illustrations and example, it is seen that the practice of my invention not only substantially decreases the whipping time required to reach an overrun of 100%, but results in the production of a smoother, firmer, drier ice cream having excellent "melt down" qualities than heretofore possible. Thus, not only is the ice cream produced more economically, but the quality and consumer appeal of the finished product is enhanced considerably.

I claim:

1. An edible product of the class consisting of an ice cream mix and ice cream in which the fat content consists essentially of butterfat, containing about 0.01% to 1% of a higher fatty alcohol having at least twelve carbon atoms in the molecule.

2. An edible product of the class consisting of an ice cream mix and ice cream in which the fat content consists essentially of butterfat, containing about 0.01% to 1% of stearyl alcohol.

3. An edible product of the class consisting of an ice cream mix and ice cream in which the fat content consists essentially of butterfat, containing about 0.01% to 1% of cetyl alcohol.

4. In the method of making ice cream from an ice cream mix in which the fat content consists essentially of butterfat, the step consisting of adding to such ice cream mix from about 0.01% to 1.0% of stearyl alcohol, based on the weight of said ice cream mix.

5. In the method of making ice cream from an ice cream mix in which the fat content consists essentially of butterfat, the step consisting of adding to such ice cream mix from about 0.01% to 1.0% of a higher fatty alcohol having at least twelve carbon atoms in the molecule, based on the weight of said ice cream mix.

HIRAM T. SPANNUTH.

REFERENCES CITED

The following references are of record in the file of this patent:

UNITED STATES PATENTS

| Number | Name | Date |
|---|---|---|
| 1,434,070 | Smith | Oct. 31, 1922 |
| 1,547,571 | Ellis | July 28, 1925 |
| 1,921,124 | Hermann et al. | Aug. 8, 1933 |
| 1,933,732 | Haskins | Nov. 7, 1933 |
| 2,350,082 | Taussky | May 30, 1944 |

OTHER REFERENCES

Allen's Commercial Organic Analysis, vol. II, fourth edition, pub. 1910, reprinted Aug. 1914, by P. Blakiston's Son and Co., Philadelphia, pages 92, 184, 185, 187 and 188.

"Ice Cream Trade Journal," Sept. 1933, pages 21 and 22.

"Food Manufacture," Mar. 1, 1941, vol. XVI, No. 3, page 60.

"Food Manufacture," Aug. 1, 1941, pages 182 and 183.

"Ice Cream Review," April 1941, vol. 24, No. 9, page 120.